R. W. SPRINGER.
METHOD OF AERIAL NAVIGATION.
APPLICATION FILED APR. 20, 1906. RENEWED SEPT. 22, 1916.
1,208,684.
Patented Dec. 12, 1916.
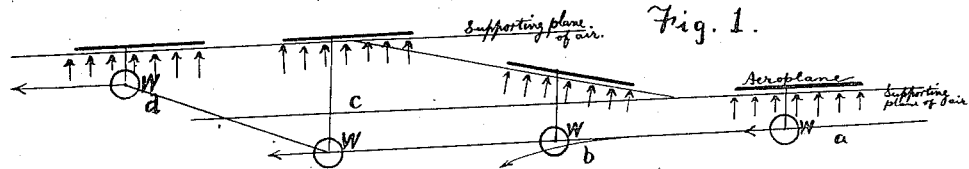
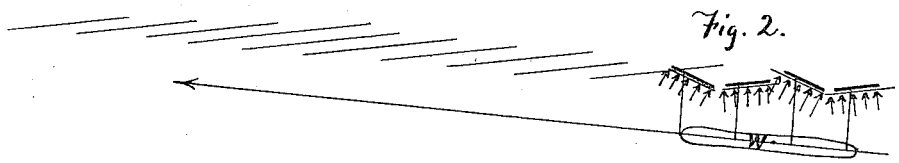
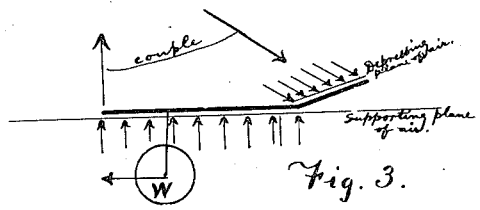
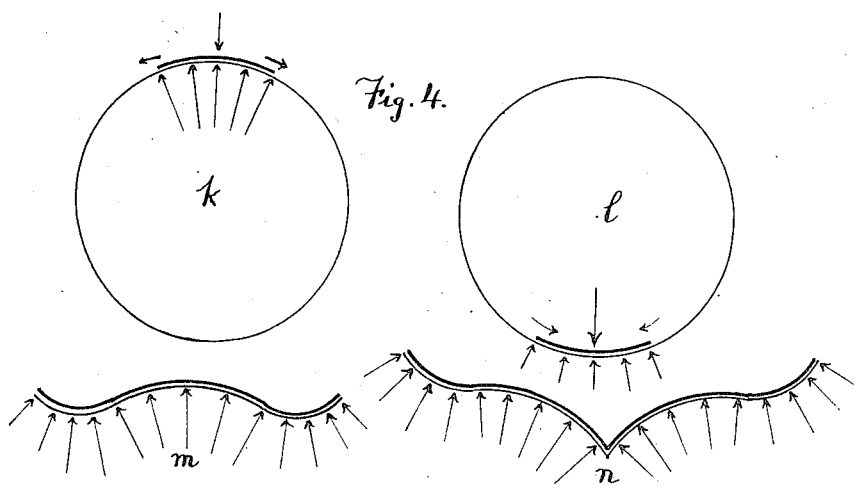

UNITED STATES PATENT OFFICE.

RUTER W. SPRINGER, OF SPRINGFIELD, ILLINOIS.

METHOD OF AERIAL NAVIGATION.

1,208,684.  Specification of Letters Patent.  Patented Dec. 12, 1916.

Application filed April 20, 1906, Serial No. 312,891.  Renewed September 22, 1916.  Serial No. 121,690.

*To all whom it may concern:*

Be it known that I, RUTER W. SPRINGER, a citizen of the United States, residing at Springfield, in the county of Sangamon and State of Illinois, have invented certain new and useful Improvements in Methods of Aerial Navigation, of which the following is a specification.

The object of my invention is to provide a method of safely and rapidly navigating the air.

There are several methods of aerial navigation. The first is by apparatus which, in the gross, is lighter than air, or buoyant.
This may be with or without a motor. There is in nature no good example of this method of aerial navigation: but it is seen in aqueous navigation in most of the fishes.

A second method consists in providing a flat surface, by the reaction of the air upon which the entire apparatus is to be supported. This flat surface or aeroplane must be driven forward by propellers or fans. Its front end will be slightly elevated. The entire apparatus is usually heavier than air, sometimes considerably heavier. On the other hand, the aeroplane may be constructed in the form of, or in conjunction with, buoyant floats which will more or less support the weight of the apparatus; and this buoyancy may be increased until the first form of aerial navigation has been reached. The second form of aerial navigation is represented in most insects, whose bodies are light and whose wings impinge upon the air on both their upper and lower surfaces. These wings are therefore, strictly speaking, reciprocating propellers, or fans, and verge into the third form of aerial navigation.
The third method of aerial navigation is that wherein a rapidly moving propeller reacts practically downward against the air, so as to cause the entire apparatus to move vertically upward. This is seen in nature in the hovering of insects and smaller birds, and is the most expensive form of aerial navigation which is known.

A fourth method of aerial navigation consists in providing supporting planes which reciprocate more or less vertically, but at all times have the air pressure upon their lower surfaces. In this method, forward motion is attained through the resultant of the weight of the apparatus and the pressure of the air acting upon the wings. There must, therefore, be weight much beyond that of the air, or there can be no forward motion. In this method of flight, the wings must move somewhat slowly, because, if they move rapidly, there will be an air pressure upon the upper surface. I believe that the most of the birds fly in this manner and according to the method I am now claiming: but I have nowhere seen any proof of the fact in any publication.

In carrying out the method of aerial navigation herein described and claimed, I may employ such apparatus as described in my application Serial Number 309911, filed April 4, 1906, or I may use any other apparatus of suitable form.

Reference is to be had to the accompanying drawings, which show in diagrammatic form the operations to be performed.

Figure 1 illustrates the ordinary method of flight as herein claimed; Fig. 2 illustrates the ordinary method of flight by the use of a plurality of supporting air surfaces employed asynchronously. Fig. 3 illustrates the method of obtaining fore-and-aft stability; and Fig. 4 illustrates the method of obtaining lateral stability.

It has been demonstrated that, when a weighted aeroplane is caused to pass very rapidly through the air horizontally, the air beneath it resists its downward progress almost as if the air were solid. If the aeroplane moves slowly, it will settle through the air quite rapidly: but, if it moves very swiftly, it hardly settles at all. This may be compared, rather loosely, with a skater skating very quickly over ice which is far too thin to support his weight. In the following specification, I shall speak of air as formed into a resisting plane, in referring to this phenomenon. Of course, even if the aeroplane moves quite slowly, the air beneath it will form a resisting plane, but with much less resistance.

My invention consists in producing in the air resisting planes at various angles to the horizontal and of varying degrees of resistance, in such manner as to sustain and rapidly drive forward the apparatus which causes these resisting planes.

The invention relates entirely to gravitational flying, wherein the propelling force is altogether derived from the gravity of the apparatus, through the parallelogram of forces. The aviator glides forward and downward, upon what may be called a gliding-plane of supporting air, and then regains his original altitude by ascending on what may be called a rising-plane of supporting air.

Referring to Fig. 1, if a flying machine of the class referred to, while gliding swiftly forward and downward, (a), suddenly changes the relation of its wings to the supporting plane or planes, by elevating the front edges of the wings, it is evident that a greatly increased pressure would momentarily be brought upon the lower surface of the wings, due to the sudden impact upon them of the supporting plane or planes of air. The momentum of the apparatus, combined with the force of gravitation, will cause its center of gravity to move forward in a downwardly turned parabolic curve, whenever the support of the air is removed. If, now, after suddenly turning the front edges of the wings upward, the weight being supported by the wings be reduced by allowing them to oscillate, "flap", or otherwise move upwardly, (b), independently, more or less, of the main portion or weight (w) of the apparatus,—the center of gravity of the apparatus will continue to move forward approximately in the line of flight, while the wings have passed upward and will find supporting air-planes at a higher level. If, now, the wings be brought into their first or normal fore-and-aft position, the soaring (c) may be continued as before. Now, while soaring, the wings, or aeroplanes, may be brought downward: and, in so doing, the center of gravity of the entire apparatus will be bodily lifted by exerting a downward pull or pressure on the air plane on which the apparatus is gliding, which plane constitutes a support on which the apparatus as a whole may be not only supported, as in gliding, but also lifted, as indicated by the position d in Fig. 1, whenever the wings are forcibly moved downwardly.

In carrying out this process, I may use one aeroplane, a pair of aeroplanes (wings), or several pairs of aeroplanes: in the latter case, the aeroplanes may all move synchronously, or they may move asynchronously, as preferred. If the wings move asynchronously, (Fig. 2), the downwardly moving wings will ordinarily assume somewhat more of the weight of the apparatus, and the supporting planes under the upwardly moving wings may merely serve to lift the wings themselves. The amount of weight supported by the air beneath the upwardly moving wings will depend largely upon the angle of the wings and the speed of flight. It is to be understood that these steps will be repeated rhythmically and successively, in the order stated, and that my invention has no relation to any momentary or accidental shifting of wings, for other purposes, as may have been heretofore practised in aeronautics.

Another portion of my invention (Fig. 4) relates to the employment of concave resisting planes of air. A convex resisting plane of air, (k), produced by an aeroplane concave on its lower surface, has more sustaining power, because the air is pressed together and partially solidified by the circumscribing walls of the aeroplane: but a concave surface (produced by an aeroplane convex below l) has more adhesive power, the air being pressed outwardly in all directions tending to press the apparatus back into its normal position. An aeroplane, in other words, tends to slide edgewise off the top of a convex surface, just as a drop of water tends to roll off the top of an apple: but it will stick in the trough of a concave supporting surface of air, just as a drop of water will hang on the lower side of the same apple. Therefore, in order to obtain a great buoyancy supporting planes of air should be made convex: but, in order to obtain stability, (m), these convex planes should be flanked by concave supporting planes of air. This I may accomplish (n) by making the wings concave next the shoulder and convex near the outer extremities: or by any other means which will produce this result.

Having thus fully described my invention, and the mode of its operation, I claim:—

1. The art of continuous gravitational aerial navigation which consists in presenting the supporting surfaces of a flying machine in motion to the atmosphere at such an angle as will cause the machine, under the influence of gravity, to glide forwardly and downwardly, then changing the angle of the said supporting surfaces to the air so as to increase their angle of incidence and cause a lifting effect upon the machine, then changing the angle of the said supporting surfaces to again cause the machine to glide downwardly, and successively and rhythmically repeating these changes; and at the same time these operations are taking place causing up and down movements of the supporting surfaces, relative to the flying machine as a whole, these latter movements being timed and synchronized with reference to the changes of the angles of the supporting surfaces as set forth, so that the downward movements thereof are caused during the time the supporting surfaces are more downwardly inclined, and the upward movements during the other inclinations thereof.

2. The art of continuous gravitational aerial navigation which consists in presenting the supporting surfaces of a flying machine in motion to the atmosphere at such an angle as will cause the machine, under the influence of gravity, to glide forwardly and downwardly, then rapidly changing the angle of the said supporting surfaces to the air, causing them to assume an upward inclination from rear to front whereby the machine is caused to ascend, and at the same time the machine is thus ascending causing the supporting surfaces to be moved upwardly relative to the machine as a whole, and then again changing the angle of the supporting surfaces so as to permit the machine to glide downwardly, and at the same time causing the wings to move downwardly relative to the body of the machine as a whole, and successively and rhythmically repeating these operations.

3. In the art of continuous gravitational aerial navigation in which a machine with supporting surfaces that are caused to move upward and downward are employed, the herein described method which consists in synchronizing the up and down movements of the supporting surfaces and tilting movements of the said surfaces relative to the horizon, the downward movements of the supporting surfaces and their more downward inclinations occurring simultaneously and their upward or less downwardly inclined inclinations and upward movements taking place simultaneously, and these synchronized movements being produced successively and rhythmically, whereby the machine is caused to glide along a series of successive supporting bodies of air the beginning of each glide being at a higher level than the ending of each preceding glide.

4. The art of continuous gravitational aerial navigation, which consists in producing a gliding plane of supporting air and passing rapidly forwardly and downwardly thereon, and while thereon elevating the center of gravity of the apparatus relative to the said gliding plane by exerting an increased downward pressure thereon, then forming a rising plane of supporting air and passing rapidly forwardly and upwardly thereon, and while thereon, lowering the center of gravity of the apparatus relative thereto, and rhythmically and successively repeating these steps.

5. The art of continuous gravitational aerial navigation, which consists in rhythmically producing in succession gliding planes of air, with rising planes of air between them, passing rapidly forward from one plane to the next over the said rising planes and increasing the downward pressure of the apparatus while supported upon the gliding planes and reducing the pressure while on the rising planes.

6. The art of continuous gravitational aerial navigation in which apparatus with flapping wings is employed, which consists in producing a supporting gliding plane of air over which the wings rapidly glide, then rapidly passing onto a rising plane of air and while the wings are thereon causing them to rise, whereby the center of gravity of the machine is relatively lowered, then passing onto another gliding plane with the wings elevated, and while on such second gliding plane causing the wings to press downward upon such air plane, whereby the center of gravity of the apparatus is raised, and successively and rhythmically repeating these operations.

In testimony whereof I affix my signature in the presence of two witnesses.

RUTER W. SPRINGER.

Witnesses:
JESSE C. BROOKE,
LUCIA M. DELANO.